United States Patent
Biswas et al.

(10) Patent No.: US 7,197,074 B2
(45) Date of Patent: Mar. 27, 2007

(54) PHASE PLANE CORRELATION MOTION VECTOR DETERMINATION METHOD

(75) Inventors: Mainak Biswas, La Jolla, CA (US); Truong Q. Nguyen, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 767 days.

(21) Appl. No.: 10/370,048

(22) Filed: Feb. 20, 2003

(65) Prior Publication Data
US 2004/0179594 A1 Sep. 16, 2004

(51) Int. Cl.
*H04N 7/12* (2006.01)
*G06K 9/36* (2006.01)

(52) U.S. Cl. .................. 375/240.16; 382/236
(58) Field of Classification Search .......... 375/240.16, 375/240.24, 240.29; 382/103, 107, 236; 348/140, 619, 699
See application file for complete search history.

(56) References Cited

U.S. PATENT DOCUMENTS

| | | | | |
|---|---|---|---|---|
| 5,398,078 A | * | 3/1995 | Masuda et al. | 348/699 |
| 5,534,946 A | * | 7/1996 | De Haan et al. | 348/619 |
| 5,588,067 A | * | 12/1996 | Peterson et al. | 382/103 |
| 5,953,079 A | * | 9/1999 | Burl et al. | 348/699 |
| 6,385,245 B1 | * | 5/2002 | De Haan et al. | 375/240.16 |
| 6,473,462 B1 | * | 10/2002 | Chevance et al. | 375/240.16 |
| RE38,420 E | * | 2/2004 | Thomas | 348/140 |
| 2004/0062420 A1 | * | 4/2004 | Rohaly | 382/107 |

OTHER PUBLICATIONS

Adelson et al., "The extraction of Spatio-temporal energy in human and machine vision", Proceedings from the workshop on motion: Representation and Analysis, May 1986, pp. 151-155.
Choi et al., "New frame rate-up conversion using bi-directional motion estimation", IEEE Tr. on Circuits and Systems for Video Technology, vol. 46, Issue 3, Aug. 2000, pp. 603-609.
de Haan et al., "True motion estimation with 3-D recursive search block matching", IEEE Transactions on Circuits and Systems for Video Technology, vol. 3, No. 5, Oct. 1993, p. 368-379.

(Continued)

*Primary Examiner*—Gims Philippe
(74) *Attorney, Agent, or Firm*—Greer, Burns & Grain, Ltd.

(57) ABSTRACT

A phase plane correlation motion vector determination method identifies images areas in which motion took place. A reference image is shifted by the candidate motion vectors obtained from the phase plane correlation. The shifted reference image is correlated to determine similarity with the current image and to eliminate spurious motion vectors. Candidate motion vectors are validated to determine valid motion vectors and identify problem areas. In a preferred embodiment, a correlation resolution is set to a sub-block size. Sub-blocks of the reference image are shifted by candidate motion vectors for corresponding blocks. Shifted sub-blocks are correlated with sub-blocks of a current image using a sub-block neighborhood to determine valid vector assignments. Where an assignment proves invalid, global motion parameters are determined to assign motion vectors to sub-blocks where correlation fails.

20 Claims, 6 Drawing Sheets

OTHER PUBLICATIONS

Devereux, V.G., "Standards conversion between 1250/50 and 625/50 TV Systems", International Broadcasting Convention, 1992.

Erturk et al., "Image sequence stabilisation based on DFT filtering", IEEE Proc-Vis, Image Signal Process, vol. 147, No. 2, Apr. 2000, pp. 95-102.

Pelagotti et al., "A new algorithm for high quality video format conversion", ICIP 2001, vol. 2, pp. 375-378.

Stiller et al., "Estimating motion in image sequence", IEEE Signal Processing Magazine, Jul. 1999, pp. 70-91.

Thomas, G.A., "A comparison of motion compensated interlace to progressive conversion methods", BBC R7D, 1996/9.

Thomas, G.A., "Application of motion-compensation to video processing in the TV studio", IEEE Colloquium on Video Processing, 1991.

Thomas, G.A., "Distorting the time axis: Motion-compensated image processing in the studio", International Broadcasting Convention, 1988.

Thomas, G.A., "Television motion measurement for DATV and other applications", BBC RD 1987/11.

Tudor, Phil, "Progressive transmission of interlaced pictures", BBC R&D, pp. 1-15.

* cited by examiner

PHASE PLANE CORRELATION MOTION VECTOR DETERMINATION METHOD

FIELD OF THE INVENTION

A field of the invention is image and video processing.

BACKGROUND OF THE INVENTION

Obtaining clear, high resolution images and video from digital data continues to be a difficult problem faced in the image processing field. Fundamental data to determine for many applications are motion vector data. Motion vector data provides knowledge of the speed and direction of movements of at least critical parts of the image, e.g., portions of the image determined to be changing over a time period such as from a predetermined image frame to a subsequent image frame. Applications making use of motion vector data include format conversion, de-interlacing, compression, image registration and any others where any sort of temporal interpolation is necessary.

Specific format conversion examples include frame rate conversion, such as the conversion of NTSC video rate to HDTV video rate and the conversion of interlaced video to progressive video. Another format conversion example is the 3-to-2 pull-down artifact removal in conventional DVD format video. Video data compression is another example that benefits from accurate motion vector data. Compression is generally necessary to permit the useful transmission of data and forms a critical part of many video compression algorithms, such as the video compression standards MPEG2, MPEG4, H.26L, etc. Another exemplary application that benefits from accurate motion vector data analysis is for production of display special effects, such as the global estimation of camera parameters useful to produce display effects for pan, tilt or zoom.

Digital handling of television signals (e.g., encoding, transmission, storage and decoding), as a practical matter, requires use of motion vector data. Motion vector data is needed because a television signal is not typically filtered in the manner required by Nyquist criterion prior to sampling in the temporal domain. Thus, a moving image contains information that is temporally aliased. Conventional linear interpolation techniques accordingly are not successful in the temporal domain.

The ITU-T (International Telecommunication Union Tele-communication Standardization Sector) recommends H.261 and H.262 as methods for encoding, storing, and transmitting image signals. The ISO (International Organization for Standardization) recommends MPEG-1(11172-2) and MPEG-2 (13818-2). These methods adopt inter frame prediction for motion compensation in encoding video signals.

Inter frame prediction is based upon the recognized redundancy characteristic of video data. Video signals produce highly redundant information from frame to frame, as many image elements of a predetermined frame will be repeated in a subsequent frame. This holds true for frames generated as a result of special effects, for example, or frames generated to increase the definition of a video signal. Motion compensated inter frame prediction is a technique that takes advantage of the inter frame redundancy to reduce the amount of data required to describe sequences of video frames or to create images frames, such as those created for example, in producing a progressive scan video signal from an interlaced video signal. An accurate determination of frame to frame motion is important to conduct such operations.

A typical method for motion detection in the prior art is conducted in the image domain and involves an attempt to match blocks from a reference (previous) image frame with blocks from a current (subsequent to the reference) frame. Many so-called block matching methods start with calculating the absolute values of the differences in pixels in a block of a current image frame with all of the blocks in the reference image frame. A block in the current image frame having the smallest difference is determined to match. The displacement between the block in the current frame and the corresponding matching block in the reference frame is then characterized by horizontal and vertical displacement components, thus producing a motion vector. This procedure is known as the full-search procedure.

In the full-search procedure, the absolute values of the differences between all pixels contained in the block from the current frame and all pixels contained in all reference blocks within a reference image frame are calculated. The sum of the absolute values of the differences needs to be calculated for each reference block. Ideally, a method should be able to measure motion up to about 15 pixels per field for a standard television signal, to better than one pixel accuracy. Therefore, the amount of calculation is exorbitant. Hence, high computational speed is necessary. To reduce the computation load many researchers have proposed smart searching techniques, but they often reduce the accuracy of the vectors.

A phase plane correlation technique for motion vector determination has also been developed. In the frequency domain, motion is indicated by a phase shift between a block in the current image frame and one in the reference image frame. A correlation surface obtained by an inverse Fourier transform of the phase difference indicates the quantity of pixels that moved and the magnitude of pixel movement. This has the advantage of a direct determination of the motion vectors. There remains a need for a method to calculate the motion in an image efficiently, and with a reduction in the chance for producing erroneous assignments of motion vectors to pixels.

SUMMARY OF THE INVENTION

A phase plane correlation motion vector determination method of an embodiment of the invention identifies images areas in which motion took place. A reference image is shifted by the candidate motion vectors obtained from the phase plane correlation. The shifted reference image is correlated to determine similarity with the current image and to eliminate spurious motion vectors. Candidate motion vectors are validated to determine valid motion vectors and identify problem areas. In a preferred embodiment, a correlation resolution is set to a sub-block size. Sub-blocks of the reference image are shifted by candidate motion vectors for corresponding blocks. Shifted sub-blocks are correlated with sub-blocks of a current image using a sub-block neighborhood to determine valid vector assignments. Where an assignment proves invalid, global motion parameters are determined to assign motion vectors to sub-blocks where correlation fails.

DETAILED DESCRIPTION OF THE PREFERRED EMBODIMENTS

The invention is directed to phase plane correlation motion vector determination methods and apparatuses. An adaptive validation process obtains, assigns and correlates of motion vectors. In preferred embodiments, vectors obtained by phase plane correlation are considered to be candidate motion vectors. The candidate motion vectors are evaluated to determine whether the candidate motion vectors are valid or spurious in a correlation that uses validated motion vectors and motion vectors from a reference frame. The vectors that do not result in a meaningful correlation with the reference image are identified as spurious motion vectors. Spurious motion vectors may be corrected by reference to global parameters. An image portion including a certain number of spurious motion vectors is identified as problem area requiring further processing. Further processing is conducted on the problem area. Problem areas may be corrected by an interpolation upon recognition of a category of image effects contributing to the problem areas. In a preferred embodiment, a global parameter is used to correct spurious motion vectors and problem areas. The invention is capable of determining motion vectors that can be used for a variety of applications. Exemplary applications include format conversion, de-interlacing, compression, transcoding, and image registration, etc.

The invention will now be illustrated with respect to preferred embodiments. The particular embodiments will be understood by artisans to illustrate broader aspects of the invention, and not to limit the invention to the preferred embodiments.

Figure 1:
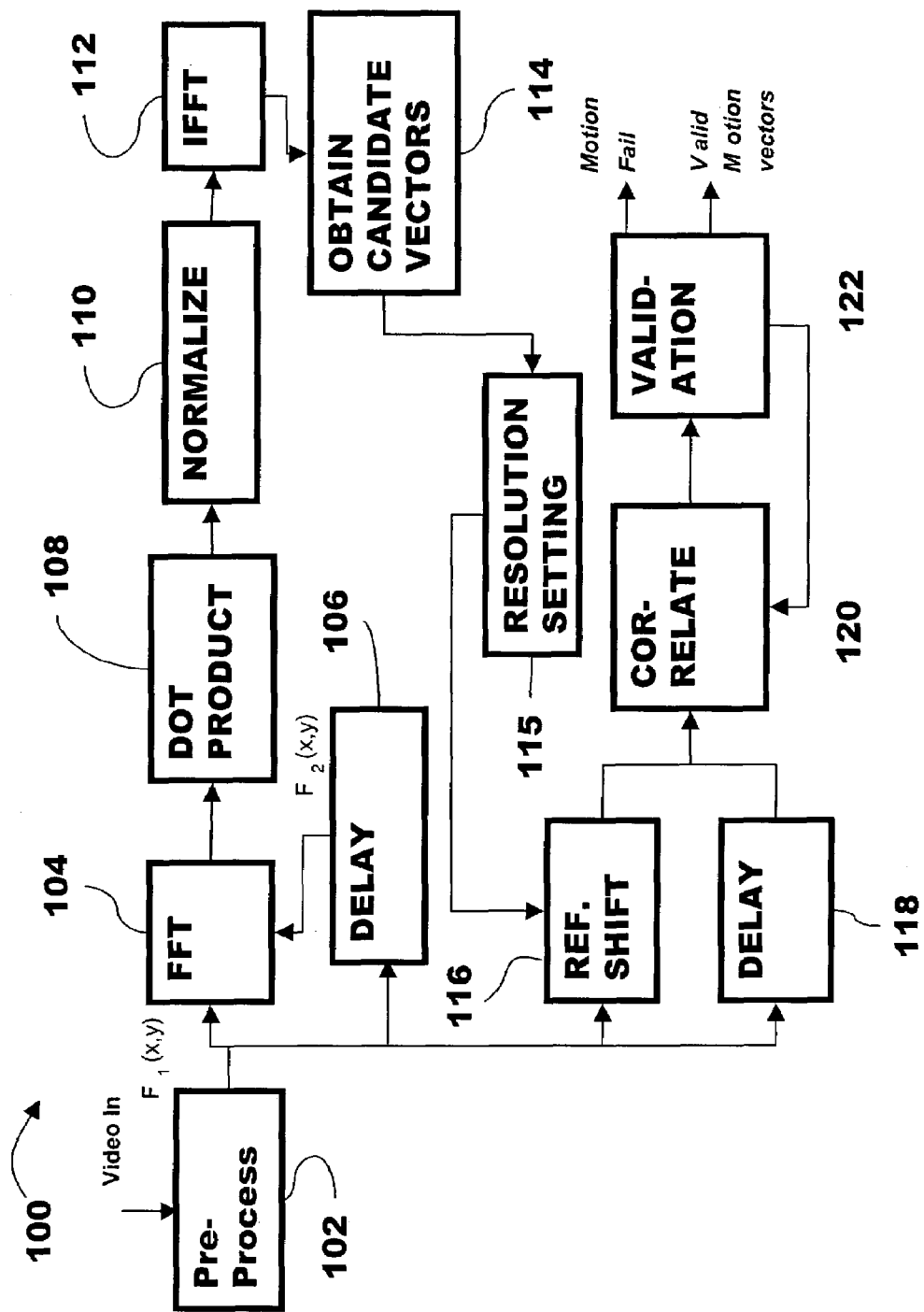
FIG. 1 is a block diagram of a preferred embodiment motion determination apparatus.

Referring now to FIG. 1, a preferred embodiment, motion vector determination apparatus 100 of the invention is shown. A video signal is received by a video pre-processor 102. The pre-processor 102 may, for example, be any sort of filter applied to raw video to remove noise and/or artifacts. An example pre-processing operation is low pass filtering. The pre-processor 102 also might perform other operations typically conducted prior to image encoding such as windowing to remove abrupt data terminations problematic to data transformations and processing.

A Fourier transform, preferably a fast Fourier transform 104 transforms, on a frame-by-frame basis, the processed video received from the pre-processor 102. Preferably, the FFT 104 is a radix 2 transform, as the calculations of a radix 2 transform are efficiently calculated. A transform is therefore conducted on blocks, where the blocks are sized in multiples of 2, e.g., 32×32, 64×64.

Figure 2:
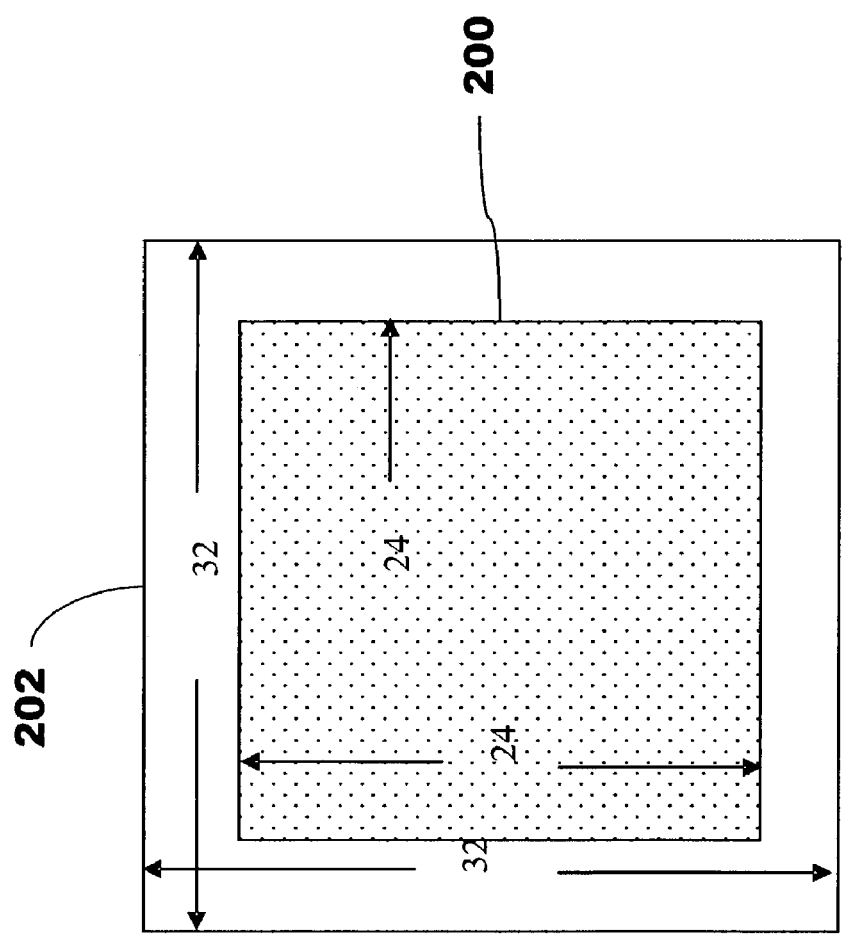
FIG. 2 illustrates a block overlap neighborhood for performing a preferred Fourier transform.

It is also possible to vary the size of the block. This may be responsive, for example, to an historical evaluation of the amount of motion being detected from frame to frame. Also, while the size of the block is set, for example to 24×24; the pixel values used in the FFT are preferably utilized from beyond boundaries of the block to reduce the effect of abrupt termination (with windowing by the pre-processor 102 as discussed above). As an example, for a 24×24 block, an overlap of 4 pixels on all sides block (from a neighborhood of 8 neighboring blocks) is taken to reduce the effect of abrupt termination of signal. Referring to FIG. 2, an exemplary 4 pixel overlap from neighboring blocks for a 24×24 block being Fourier transformed is shown. A 24×24 block 200 is transformed with use of a 32×32 block 202, i.e., a 4 pixel overlap.

Figure 3:
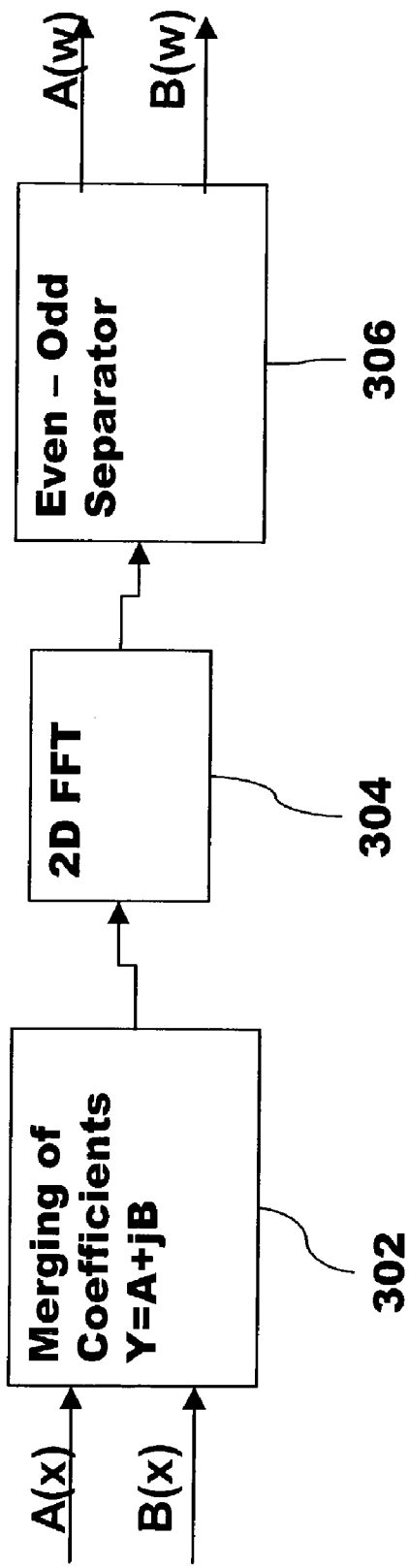
FIG. 3 is a block diagram of a preferred embodiment Fast Fourier transform for the motion determination apparatus of FIG. 1.

Since an image data matrix has real values, the two Fourier spectra of the two images can be computed using single 2D FFT. FIG. 3 illustrates a preferred method for the Fourier transform. One image frame A(x) is used as the real part and the other image frame B(x) is used as the imaginary part to merge complex coefficients 302. FFT 304 is then conducted on the merged. An even-odd separator 306 separates the transforms, permitting the Fourier coefficients of blocks of a reference and current frame to be obtained.

Referring again to FIG. 1, a field delay 106 serves to supply the current frame to the FFT 104. If $f_1$ and $f_2$ are two related images, e.g., such as blocks in successive frames of video, that differ only by a displacement $(d_x, d_y)$ i.e., $$f_2(x,\ y) = f_1(x - d_x, y - d_y),$$

their corresponding Fourier transforms $F_1(\omega_x, \omega_y)$ and $F_2(\omega_x, \omega_y)$ will be related by $$F_2(\omega_x,\ \omega_y) = e^{-j(w_x d_x + w_y d_y)} * F_1(\omega_x, \omega_y),$$

where the symbol (*) denotes multiplication operation.

The cross power spectrum of two images $f_1$ and $f_2$ with Fourier transforms $F_1$ and $F_2$ is defined as $$\frac{F_1(\omega_x, \omega_y) F_2^*(\omega_x, \omega_y)}{|F_1(\omega_x, \omega_y) F_2^*(\omega_x, \omega_y)|} = e^{j(w_x d_x + w_y d_y)},$$

(Equation 1) where $F_2^*$ is the complex conjugate of $F_2$, the shift theorem guarantees that the phase of the cross power spectrum is equivalent to the phase difference between the images. A dot product process 108 obtains the information from the numerator and denominator of Equation 1. The result of Equation 1 is obtained by a normalizer 110.

An inverse Fourier transform 112 of the representation in the frequency domain produces a function that is an impulse and is approximately zero everywhere except at the displacement that is needed to optimally match the two images. This is known in the art as a correlation surface. Motion vectors are indicated by peaks on the correlation surface, and these vectors are treated as candidate motion vectors according to the invention.

Candidate motion vectors are produced on a block-by-block basis. A correlation and validation to be discussed will assign motion candidate motion vectors to pixels. According to another aspect of the invention, a resolution, i.e., a sub-block size, for the correlation and validation is then set. A resolution setting 115 sets the block size to be smaller than that used in the processing to obtain the correlation surface. For example, the sub-block size can be chosen to be 2×2 or 4×4. The size may be chosen based upon recognition of the difficulty of the video being processed. This may come from the determination that frames of video being processed result in a large number of spurious vectors, or problem areas. In this case, going forward to processing of a next frame, the resolution setting may determine that a smaller or larger size sub-block be used for correlation and validation.

Other factors may also influence the sub-block size selected for correlation and validation, e.g., processing time, the goal for ultimate video resolution, etc.

Having selected a sub-block size for correlation and validation, each of the sub-blocks is then symmetrically motion compensated according to the candidate motion vector for the corresponding block which was divided to produce the sub-blocks. Namely, a shifter 116 shifts sub-blocks of the reference image frame by the candidate motion vectors for the corresponding block. A delay 118 provides the current image frame to an image correlator 120. The correlation proceeds in an orderly fashion, e.g., row by row beginning with a top-left sub-block.

Figure 5:
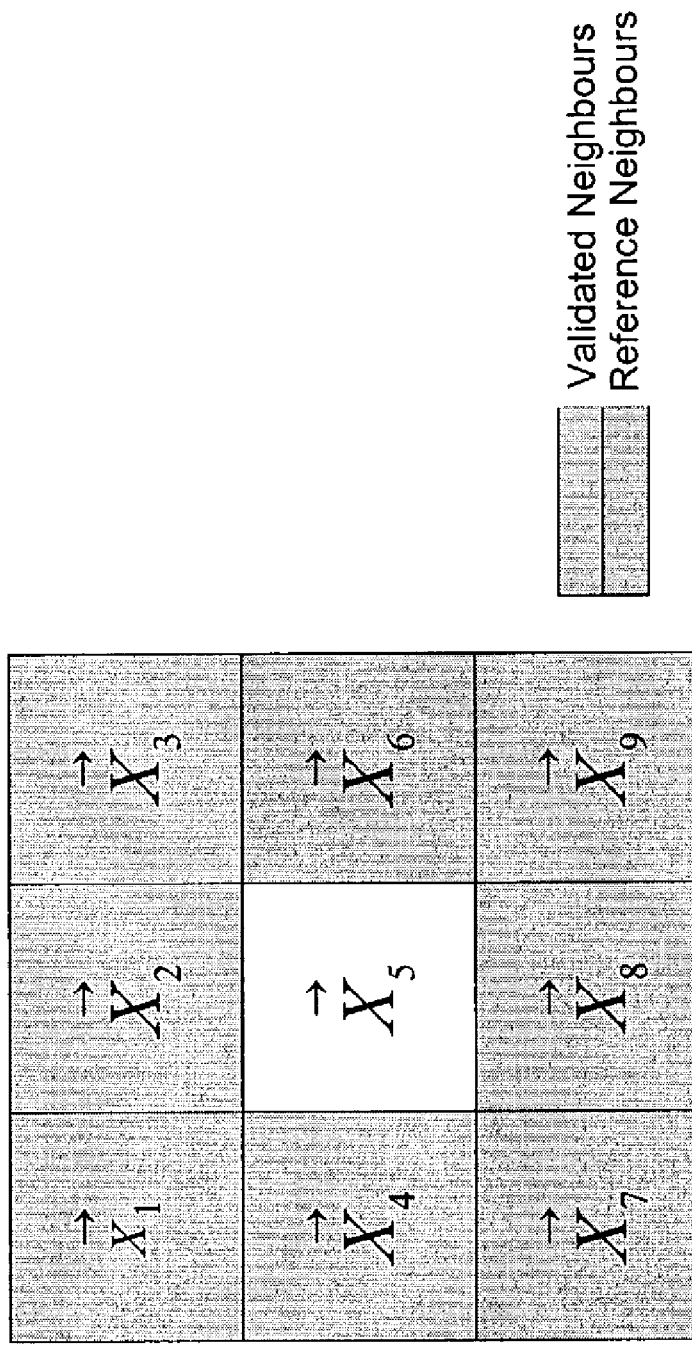
FIG. 5 illustrates a neighborhood used in a preferred embodiment correlator.

The correlator 120 preferably correlates using a sub-block being processed and a neighborhood of 8 surrounding sub-blocks. Referring to FIG. 5, the correlation will use validated motion vectors corresponding to sub-blocks in the current frame and motion vectors from sub-blocks of the reference frame.

Surrounding neighbors of a sub-block are used while extracting the candidate motion vectors. FIG. 5 shows an example where motion vector validation for $\vec{X}_5$ is been done. Sub-blocks $\vec{X}_1, \vec{X}_2, \vec{X}_3$ and $\vec{X}_4$ are validated motion vectors from sub-blocks that have been previously processed and validated. Sub-blocks $\vec{X}_6, \vec{X}_7, \vec{X}_8$ and $\vec{X}_9$ are yet to be processed as the search starts from the top-left corner of the image. To alleviate this ambiguity of the non-causality validated motion vectors from a previous correlation are used as motion vectors for the sub-blocks $\vec{X}_6, \vec{X}_7, \vec{X}_8$ and $\vec{X}_9$. The sub-block $\vec{X}_5$ is the sub-block that has been shifted according to a candidate vector and is being correlated. If there are not validated motion vectors for one of the sub-blocks $\vec{X}_1, \vec{X}_2, \vec{X}_3$ and $\vec{X}_4$, then the sub-block is excluded from the correlation.

For the correlation, it is assumed that motion is linear. For 9 sub-blocks used to perform a correlation there are 9N, where N is the number of candidate motion vector from each sub-block. Due to spatio-temporal smoothness, the non-repeating motion vectors are much fewer than 9N. A validation 122, among other operations, finds non-repeating motion vectors and arranges them in order of significance. Motion vectors from the current sub-block $\vec{X}_5$ are assigned larger weights. Correlation is made by comparison to an error threshold. The threshold set is, in general, arbitrary and depends primarily on the required quality measure to be realized in the motion vector assignment and interpolation. The error may be measured, for example, by the sum of the mean square error of pixel differences, or, as another example, by the sum of the absolute value of the pixel differences.

As interpolators are not ideal, the spectral content of the motion compensated sub-block in the previous (reference) frame differs from the non motion compensated sub-block in the current frame. The image correlator 120 could reject the correct sub-block assignment for a candidate motion vector as a result of this difference. Thus, it is preferable to use a symmetrical motion compensation to avoid this problem.

Similarities between pixel values within the allowable selected limit for error provides an indication from the correlation 120 that a sub-block assignment for a candidate motion vector has been found. The validation 122 accepts vector assignments to sub-blocks wherein the correlation is within the selected limit for error as valid motion vector assignments Where the error threshold is outside the allowable limit, the motion vectors are deemed to be spurious motion vectors for the sub-block being processed. The validation 122 seeks to replace spurious motion vectors with validated motion vectors.

Figure 4:
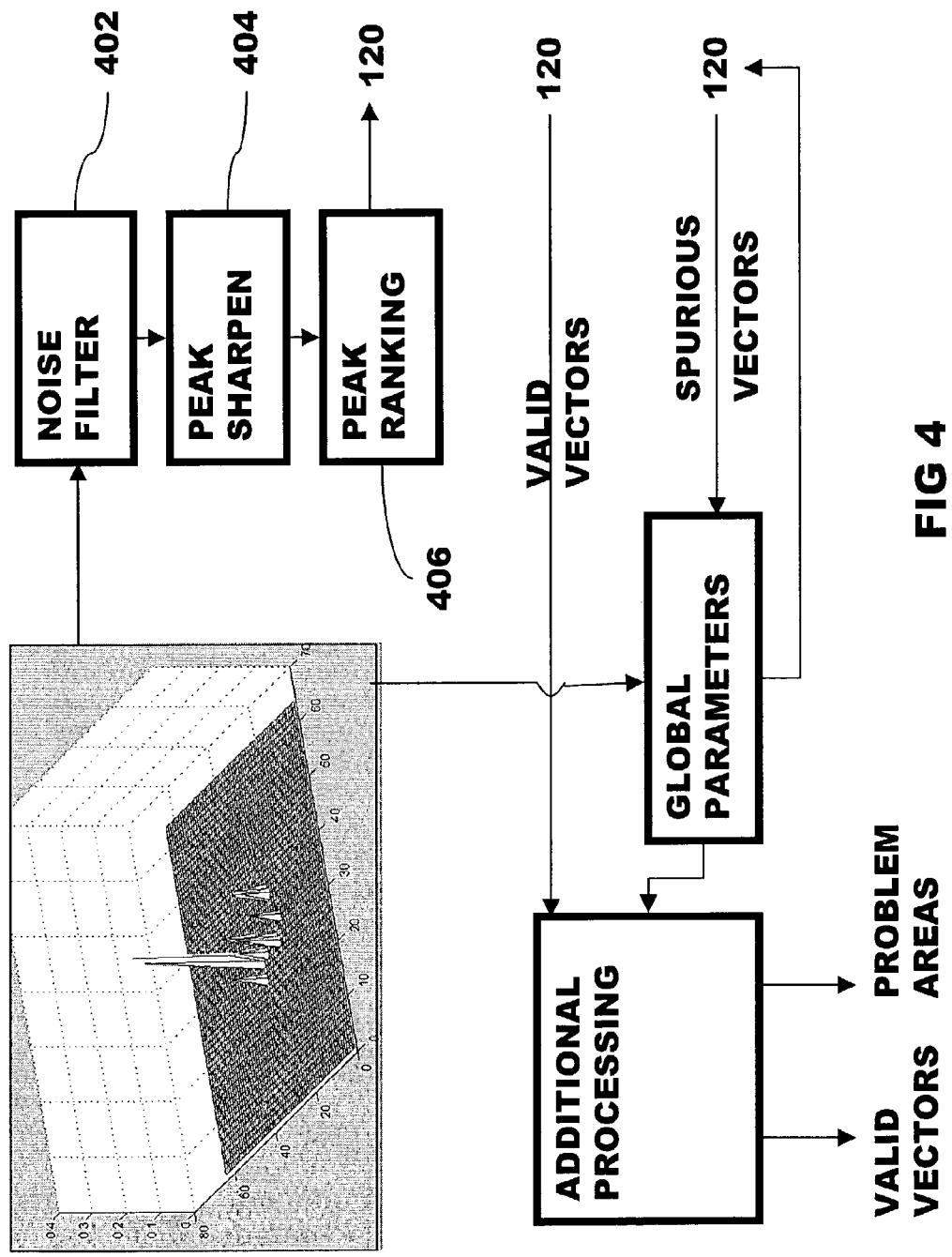
FIG. 4 is a block diagram of a preferred embodiment candidate vector obtainment for use in FIG. 1.

The validation 122 also may provide additional information to influence the correlation 120. In a preferred embodiment, the correlation is a weighted correlation. Details for a preferred validation 122 are shown in FIG. 4. FIG. 4 shows an exemplary correlation surface 400 for a block being processed to obtain and assign candidate motion vectors to sub-blocks within the block. The correlation surface is preferably initially filtered 402 to remove any noise. The filtered surface is then preferably thresholded and normalized to sharpen the peaks 404. The height of the peaks in the surface 400 indicate the number of pixels being moved, while the position of peaks indicates the direction and magnitude of movement. A block with no movement would have a single peak at the center of the correlation surface.

A ranker 404 ranks motion vectors according to peak magnitude. The magnitude information may be used in the correlation 120. For example, the correlation may proceed through candidate motion vectors in order of magnitude from greatest to least. Candidate motion vectors having an insufficient peak magnitude may be omitted in the correlation 120. Weighting might also be used, with motion vectors having larger peak magnitudes being given greater weight in the correlation.

Spurious motion vectors may be replaced with motion vectors obtained via a determination of global motion parameters 408. Global motion parameters indicate a symmetrical movement, for example identifying the potential presence of pan, zoom or tilt in the image from a statistical variation of the candidate motion vectors in the correlation surface for a group of blocks, or, more preferably, for an entire frame. Vectors having a common direction in different blocks will show that there is a pan in the image, for example. Geometrically varying mirrored motion vectors will imply a zoom in the image sequence. Practically, most of the sequences contain both pan and zoom in addition to rotation and tilt. For a sub-block being correlated, a spurious motion vector may be re-shifted and correlated by replacing motion of an applied but failed candidate motion vector with motion from a candidate motion vector determined with reference to the global motion parameters.

Additional processing 410 in the validation 122 has a primary function of making a check to see if neighborhoods of sub-blocks exist that produce a high number of spurious motion vectors, e.g., a majority. Such neighborhoods are identified as problem areas. Problem areas can result from complex image portions or due to occluding or appearing pixels, e.g., an image portion were an object is moving from a hidden or dark area into light. These problem areas are excluded from the set of valid vectors. Correlation on a sub-block from groups of blocks may be terminated upon identification of a problem area.

The additional processing 410 may also serve to confirm the set of vectors determined as valid assignments, for example to see if the vectors comport with a recognized. Confirmation of vector assignments as valid assignments might involve a search for anomalies. Various image analysis techniques might be applied, for example a search for a lack of smoothness, abruptness or other features not typically found in an image might reveal an invalid motion vector.

Figure 6:
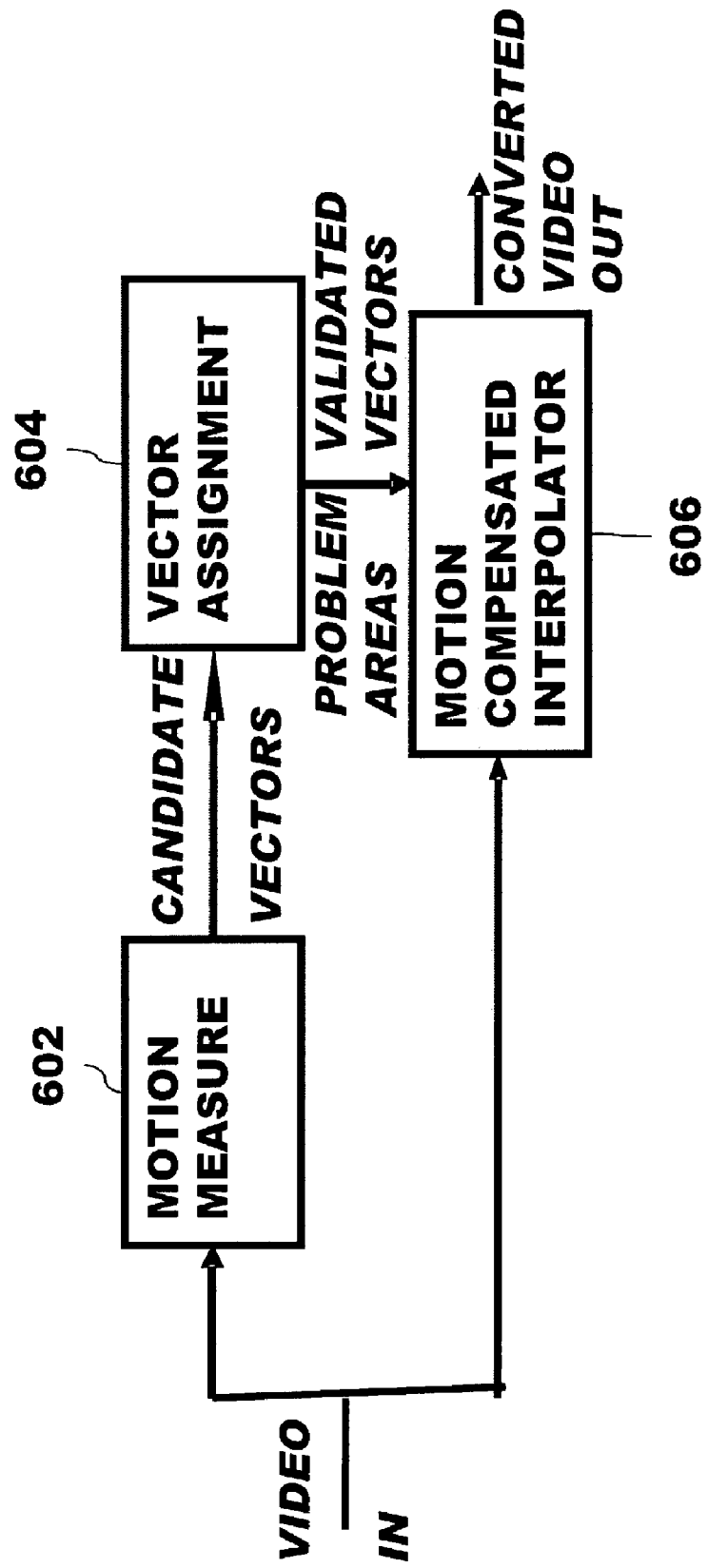
FIG. 6 illustrates a preferred embodiment system for motion compensation.

Validation 122 outputs validated motion vectors and identifies problem areas as areas where vectors no valid motion vectors could be assigned to pixels. With reference to FIG. 6, a system for video conversions is shown. The system includes motion measurement 602, by phase plane correlation, to produce candidate motion vectors. Measurement 602, in a preferred embodiment, is in accordance with FIG. 1, where the output of measurement 602 is provided by the obtain candidate vectors element 114. Vectors are then assigned to pixels 604. This involves the validation of vectors, for example by the validation 122 in FIG. 1. A validated vector field is then provided to a motion compensated interpolator in 606, which outputs converted video.

Preferably, the motion compensated interpolator 606 employs an interpolation that computes the position of the interpolated frame between the input frames and proportions the motion vector into two parts. These vectors are used to displace parts of the input frame so that the axis of interpolation lies along the optic flow axis. Non-problem parts of the image are interpolated using a spatio-temporal interpolator. The problem areas are then further processed. It is assumed that vectors converge in the area where the background is being occluded and diverge where it is revealed.

With this information, the problem areas may be fixed by selective use of surrounding areas, e.g., blocks, of the reference and current image. For the occluding objects the motion vector is taken from the previous block lying in the direction of motion and then interpolated in the forward direction using the previous frame. For the revealing objects the motion vectors is taken from the next block in the direction of motion and then interpolated in the reverse direction. This results in moving objects being placed in the current place.

While a specific embodiment of the present invention has been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method of video image motion measurement, comprising:
    phase plane correlating a current and reference image to produce a correlation surface, and to extract candidate motion vectors between blocks of the current and reference images from the correlation surface;
    setting a correlation resolution to a sub-block size;
    shifting sub-blocks of the reference image by candidate motion vectors for corresponding blocks;
    correlating shifted sub-blocks with sub-blocks of a current image using a sub-block neighborhood to determine valid vector assignments; and
    employing global motion parameters to assign motion vectors to sub-blocks where correlation fails.

2. The method of claim 1, wherein the sub-block neighborhood comprises a surrounding sub-block neighborhood of four validated sub-block vectors and four validated candidate vectors for sub-blocks from a previous correlation.

3. The method of claim 1, wherein said step of correlating conducts a weighted correlation.

4. The method of claim 3, wherein said weighted correlation weights vectors for a sub-block being correlated higher than other sub-blocks in the sub-block neighborhood.

5. The method of claim 4, wherein said step of correlating weighs motion vectors according to their peak magnitude.

6. The method of claim 1, wherein the global motion parameters are determined from a group of blocks.

7. The method of claim 6, wherein the global motion parameters are determined from an entire frame of blocks.

8. The method of claim 1, wherein said step of correlating uses fewer sub-blocks when sub-blocks in the neighborhood include sub-blocks previously found to lack a valid motion vector.

9. The method of claim 1, wherein said steps of correlating and employing are repeated to determine a set of valid motion vectors and a set of problem areas, and further comprising steps of:
    interpolating to compute position of an interpolated frame between the reference frame and the current frame; and
    selectively using portions of the reference frame and the current frame to interpolate and determine content of the problem areas.

10. The method of claim 9, wherein said step of selectively using interpolates and determines occluding problem areas from the reference frame and revealing problem areas from the current reference frame.

11. A method for determining a motion vector, the method comprising steps of:
    calculating direction and speed of displacement of a current image and a reference image having a potential displacement by a frequency domain analysis that determines a correlation surface having impulses approximately zero except at the displacement necessary to optimally match the two related images and extracting candidate motion vectors from the impulse;
    identifying image areas in which displacement took place by:
        shifting the reference image by the candidate motion vectors;
        correlating similarity with the current image to eliminate spurious motion vectors; and
        validating candidate motion vectors to determine valid motion vectors and identify problem areas.

12. The method according to claim 11, wherein said steps of validating and correlating further comprise:
    noise filtering the correlation surface;
    thresholding and normalizing to sharpen peaks in the correlation surface; and
    ranking motion vectors according to peak magnitude;
    using in said step of correlatiing, candidate motion vectors meeting or exceeding a threshold peak magnitude.

13. The method according to claim 11, wherein said step of validating further comprises:
    determining global motion parameters by determining major peaks in the correlation surface and determining whether there is a pattern in the major peaks indicative of a global motion such as a pan or zoom;
    for motion vectors falling below the peak threshold magnitude, determining candidate vectors by the global motion parameters.

14. The method according to claim 11, wherein said step of calculating is conducted on a block-by-block basis and wherein said step of correlating comprises:
    applying, on a sub-block basis, candidate motion vectors to the reference image;
    determining similarity of a sub-block being correlated with a neighborhood of sub-blocks.

15. The method according to claim 14, wherein the neighborhood of sub-blocks comprises surrounding sub-block neighborhood of four validated sub-block vectors and four validated candidate vectors for sub-blocks from a previous correlation.

16. The method of claim 11, wherein said steps of correlating and validating are repeated to determine a set of valid motion vectors and a set of problem areas, and further comprising steps of:

interpolating to compute position of an interpolated frame between the reference frame and the current frame; and selectively using portions of the reference frame and the current frame to interpolate and determine content of the problem areas.

17. The method of claim 16, wherein said step of selectively using interpolates and determines occluding problem areas by from the reference frame and revealing problem areas from the current reference frame.

18. A motion compensation system, comprising:

a phase plane correlation motion determiner that determines candidate motion vectors between a current and reference image;

a motion vector assignor that assigns candidate motion vectors to pixels and produces a valid vector set and an indication of problem areas; and a motion compensated interpolator that uses said valid vector set to interpolate between the current and reference image and selectively uses surrounding areas of the current and reference image to interpolate the problem areas.

19. The motion compensation system of claim 18, wherein said motion compensated interpolator uses surrounding areas of the current image to interpolate pixels in image areas being revealed and uses the reference image to interpolate pixels in image areas being occluded.

20. The motion compensation system of claim 18, wherein said motion vector assignor comprises:

a shifter to shift the reference image by the candidate motion vectors; and a correlator to correlate shifted portions of the reference image with the current image.

\* \* \* \* \*